United States Patent [19]

Eichenlaub

[11] Patent Number: 4,602,515

[45] Date of Patent: Jul. 29, 1986

[54] TORQUE MEASUREMENT APPARATUS CONTAINING EMBEDDED DATA STRUCTURE AND RELATED METHOD

[75] Inventor: Lawrence L. Eichenlaub, Vergennes, Vt.

[73] Assignee: Simmonds Precision Products, Inc., Tarrytown, N.Y.

[21] Appl. No.: 677,731

[22] Filed: Dec. 3, 1984

[51] Int. Cl.[4] ............................................. G01L 3/10
[52] U.S. Cl. ................................. 73/862.34; 364/506
[58] Field of Search ....................... 73/862.33, 862.34; 364/506, 508, 571

[56] References Cited

U.S. PATENT DOCUMENTS

| | | |
|---|---|---|
| 3,548,649 | 12/1970 | Parkinson . |
| 4,020,685 | 5/1977 | Van Millingen et al. ........ 73/862.34 |
| 4,444,063 | 4/1984 | Snowden et al. ................ 73/862.34 |
| 4,488,443 | 12/1984 | Parkinson . |

*Primary Examiner*—Charles A. Ruehl
*Attorney, Agent, or Firm*—Cushman, Darby & Cushman

[57] ABSTRACT

The radial dimension of selected teeth in toothed wheels used for measuring the transmitted shaft torque are changed in a predetermined spatial pattern corresponding to desired information. Such embedded data structures within the torque measurement apparatus may be used for encoding data uniquely related to the shaft twist modulus of a particular torque meter. In this manner, the toothed torque and/or reference wheels may be used to "self-compensate" or "program" appropriate electronic signal processing apparatus so as to automatically take the particular shaft twist modulus fully into account before producing output torque measurement data. At the same time, the use of such different radial tooth dimensions provides a differential amplitude modulation component in the sensor output signal which may be used to sense the relative gap dimensions (i.e., between rotating toothed wheels and a variable reluctance sensor) such that this variable parameter can also be taken fully into account by the signal processing electronics before a final output torque measurement signal is produced. Compensation for shaft speed and sensor temperature variations may also be achieved so as to result in final measured torque output data automatically compensated for variations in shaft modulus, gap, speed and temperature.

26 Claims, 7 Drawing Figures

RESULTING WAVEFORM

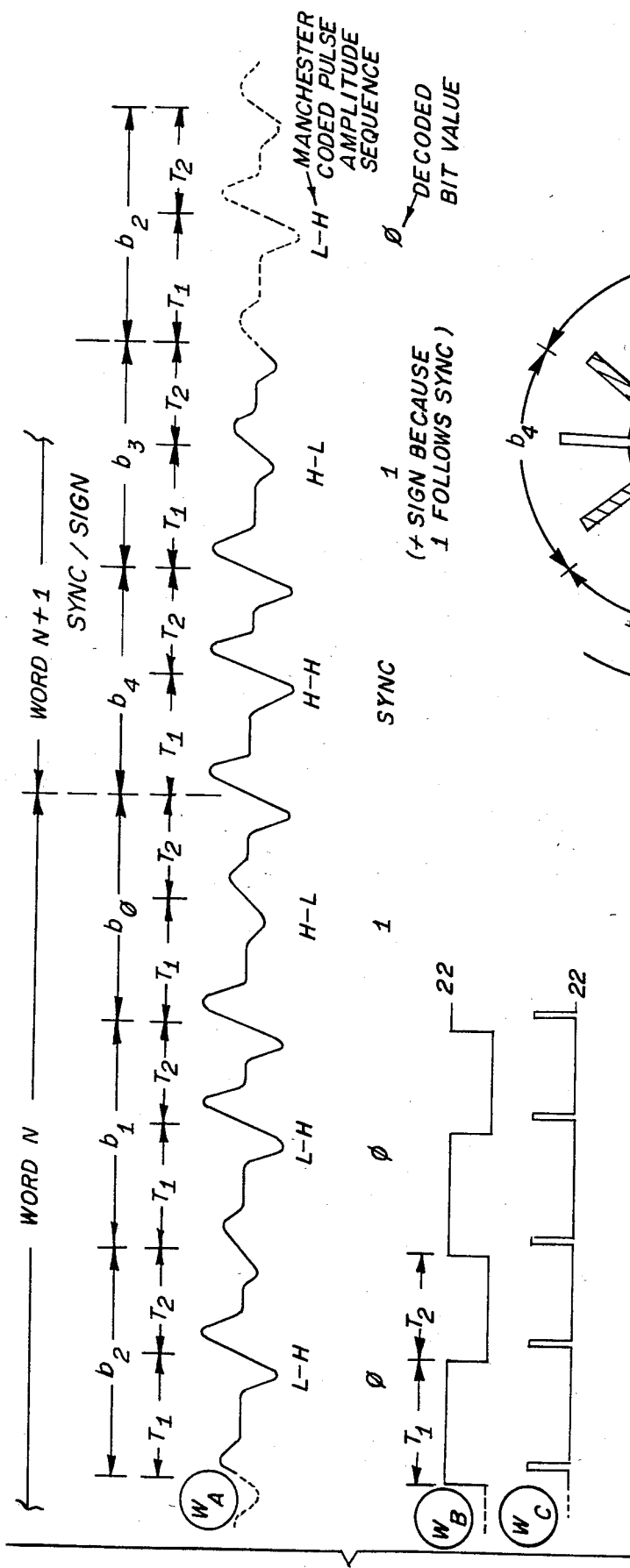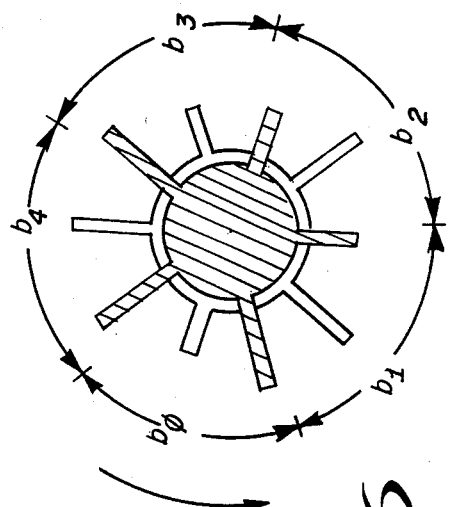

TORQUE MEASUREMENT APPARATUS CONTAINING EMBEDDED DATA STRUCTURE AND RELATED METHOD

This invention is generally related to torque measurement apparatus and method for measuring the torque transmitted by a rotatable shaft. It is particularly suited for monopole variable reluctance torque meters of the type disclosed in related commonly assigned U.S. Pat. No. 3,548,649—Parkinson (1970) and U.S. Pat. No. 4,488,443—Parkinson (1984)—(application Ser. No. 459,492 filed Jan. 20, 1983).

As disclosed in these earlier related patents, the prior art has included various systems for measuring transmitted shaft torque by measuring the "twist" or torsional deflection of a length of the shaft while it is under a torsional load. Typically, a pair of toothed wheels are physically attached to spaced-apart respective locations along the shaft and the relative displacement between the teeth of these two wheels is then detected by a suitable electrical signal transducer. For example, photo-electric or variable reluctance sensors may be utilized to detect the relative position of teeth in the two toothed wheels.

In one popular monopole sensor embodiment, the toothed wheels are physically located substantially adjacent one another although the relative rotational position of at least one of the wheels is determined by a tubular sleeve structure actually affixed to the shaft at some more significant distance away from the other wheel. In this way, sufficient shaft length is included so as to produce a desired magnitude of relative rotational movement between the toothed wheels when the shaft is torsionally loaded to a predetermined magnitude. In one such popular monopole sensor embodiment, the teeth are, at least in part, axially extended with the teeth on one wheel being interleaved between those on the other wheel and with a single pole variable reluctance sensor disposed to monitor the overlapped portions of such teeth as they rotate therepast (e.g., as depicted in the exemplary embodiments of the above-referenced related patents). Other possible arrangements may utilize toothed torque and reference wheels having primarily only radially extending teeth (e.g., see commonly assigned U.S. patent application Ser. No. 657,276 filed Oct. 3, 1984 for a monopole digital vernier torque meter by Lutton et al).

Although popular monopole torque meter systems have been very successful, errors may be introduced by at least the following system parameters: (a) variations in the gap dimension between the toothed wheels and the variable reluctance monopole sensor (typically ±0.5%); (b) the angular velocity or speed of the toothed wheels (typically ±0.3% of full scale); and (c) the torsional modulus of elasticity associated with this particular shaft (typically ±0.25%). In fact, so as to keep the error component associated with variations in shaft torsional modulus of elasticity down to this level, the variation in a particular shaft's modulus from a predetermined norm is typically measured and manually entered into the signal processing circuitry (e.g., a ROM or other digital memory device associated with a microprocessor) so as to permit compensation of the final output torque measurement for such shaft modulus variations.

As will be appreciated, the need to manually program the signal processing circuitry to compensate for a particular shaft modulus in a particular installation not only imposes added administrative overhead to successful system operation, it also increases the chance that an erroneous signal compensation will in fact be effected if the manually entered modulus compensation data is not properly coordinated with the actual shaft modulus in a given installation (including situations where a different set of electronics may be associated with a given shaft during field installation and/or maintenance procedures).

Although prior art monopole torque meters inherently have available signal components related to shaft speed, they apparently have not attempted to compensate for errors induced by speed variations.

Typically prior art monopole torque meters do not even have an available signal component related to gap dimensions and thus it is not surprising that error induced by gap variations have typically not heretofore been compensated.

Now, however, I have discovered a new torque measurement apparatus of this general type which contains embedded data structures which can be used to provide automatic compensation for torque measurement errors induced by variations in gap, speed and shaft modulus among individual torque measuring systems (while also conventionally providing temperature compensation).

In the presently preferred exemplary embodiment, differential tooth height (i.e., the radial tooth dimension) is used to encode shaft modulus data while simultaneously providing a differential amplitude modulation component related to gap size. Since signal components related to speed are also inherently present (and since the differential pulse amplitudes correspond to the encoded shaft modulus data), the signal processing circuitry of the exemplary torque meter is also enabled to automatically compensate for errors induced by gap size, speed and shaft modulus for any given system. For example, some typical errors induced by gap variations may be reduced from perhaps about ±0.5% to about ±0.1% while errors due to speed variations may be reduced from about ±0.3% (full scale) to perhaps approximately ±0.1% (full scale).

Although the error component induced by variations in shaft modulus remains approximately the same (±0.25%) as when proper modulus correction data is correctly entered manually in conventional systems, with this invention it may be provided automatically and with greater probability that it is correctly compensated. Since the shaft modulus data unique to a given shaft is permanently and physically embedded within the toothed wheels at the time of manufacture, such automatic shaft modulus compensation will necessarily be correctly entered into any appropriate signal processing circuitry connected thereto in the field during installation and/or maintenance procedures. Of course, to achieve this desired result, it is necessary to use some form of "intelligent" signal processor such as the programmed microprocessor used in the presently preferred exemplary embodiment of this invention to be described below.

Furthermore, if desired, a unique pattern of differential tooth heights may be utilized to provide a once-per-revolution synchronization marker as contemplated by the extended range monopole torque measuring system described in the above-referenced related U.S. Pat. No. 4,488,443—Parkinson (1984).

Prior art monopole torque meters typically use a phase and frequency variable signal so as to obtain a measurement of transmitted torque. The present invention adds a relative amplitude signal by using teeth having different radial dimensions. The resulting relatively different amplitude pulses output from a monopole variable reluctance sensor are then used to measure the gap dimension between the teeth and the sensor as well as to provide a digital shaft "signature" (e.g., corresponding to that particular shaft's torsional modulus of elasticity) and, if desired, to provide a unique once-per-revolution synchronization marker. Although a "Manchester" type code is employed in the exemplary embodiment (e.g., a high/low pulse pair representing logic "1" while a low/high pulse pair represents a logic "0"), there are many other available types of known digital encoding techniques which may be used. Some of these may actually reduce the required number of teeth and/or reduce phase errors that might be introduced as a result of such amplitude modulation. The relative dimensions of the short and long teeth will create a low to high amplitude ratio in the pulse train output from the variable reluctance sensor which ratio is proportional to gap size and relatively independent of speed.

As presently envisioned, all torque meter shafts may initally be constructed with uniform "long" teeth. After the variation in shaft modulus for a given shaft has been suitably measured (e.g., using conventional techniques), then an appropriate corresponding digital code may be "programmed" permanently into the toothed wheel structures by milling down or otherwise reducing the radial dimension of appropriate teeth to a "short" dimension thus creating a predetermined spatial pattern of teeth constituting different radial dimensions and thus having embedded data structures therewithin.

For any given unique torque meter system design, it will typically be necessary to gather empirical data so as to derive a suitable data base for required speed and gap compensation within the signal processor as should now be appreciated by those in the art. In addition to the usual monopole torque meter circuitry, an amplitude signal discriminator is required. These additional circuits may be utilized to decode the synchronization, shaft modulus and/or revision letter data (e.g., other compensation data uniquely related to that shaft) as well as the gap data. Since the magnitude of "high" and "low" pulses may vary slightly with speed, if extremely accurate gap compensation is required, the speed value may be included in the gap compensation.

So as to ensure a balanced rotating torque meter structure, it may be preferred to use symmetrical tooth patterns (i.e., "short" teeth located at balanced 180° intervals and "long" teeth also located at balanced 180° intervals) thus actually resulting in redundant embedded data structures being located on opposite sides of the toothed wheel structures. As will be appreciated, this will increase the total number of teeth required to encode a given number of binary bits or other digits of digital information.

These as well as other objects and advantages of this invention will be better understood by a careful reading of the following detailed description of a presently preferred exemplary embodiment of this invention taken in conjunction with the accompanying drawings, of which:

FIG. 5 is a sequence of electrical signal waveforms useful in explaining the operation of the circuitry shown in FIG. 4 and keyed thereto by reference symbols $W_A$, $W_B$, and $W_C$;

Figure 4:
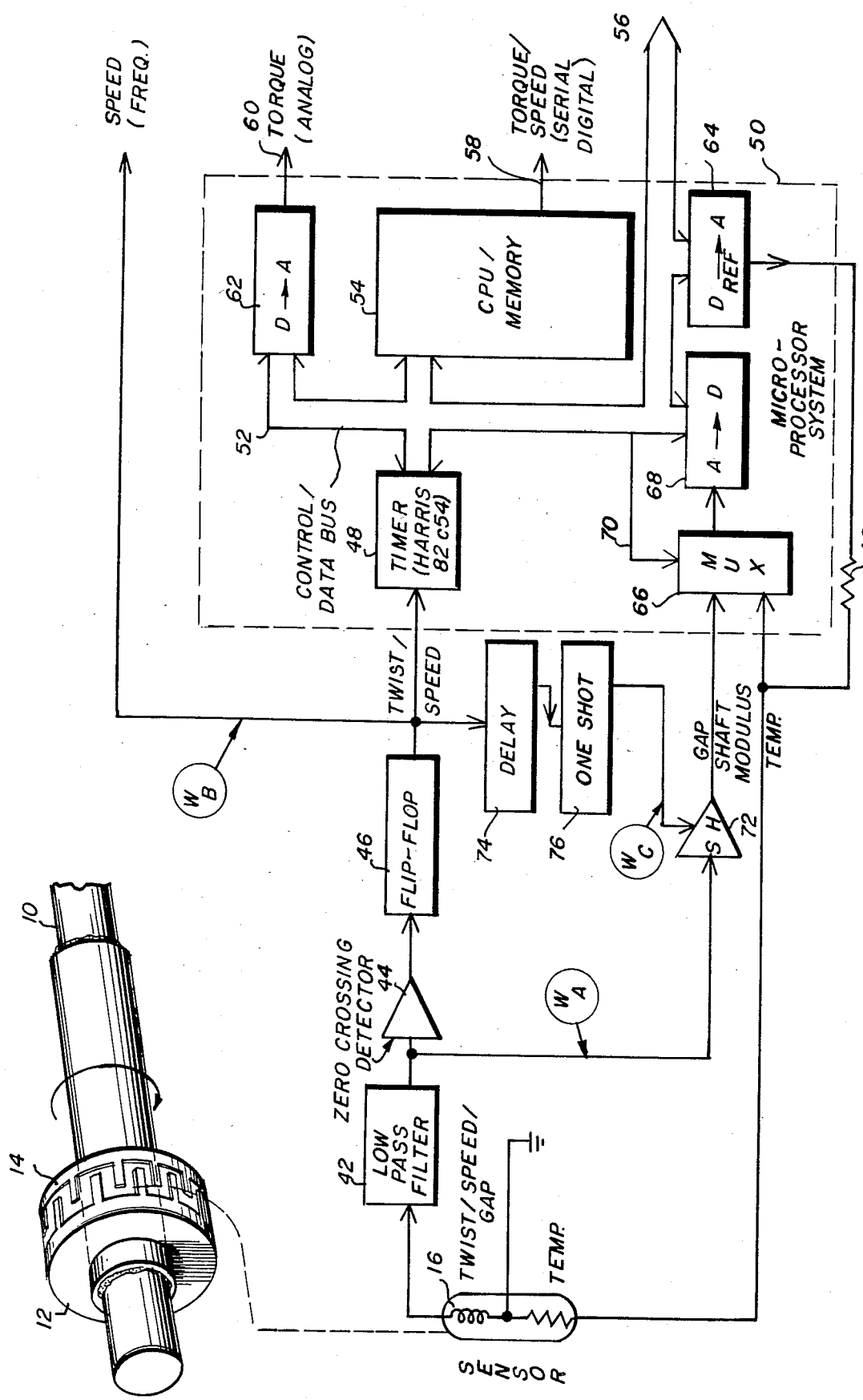
FIG. 4 is a more detailed schematic diagram of an examplary torque measurement apparatus utilizing a digital signal processor.
Figure 7:
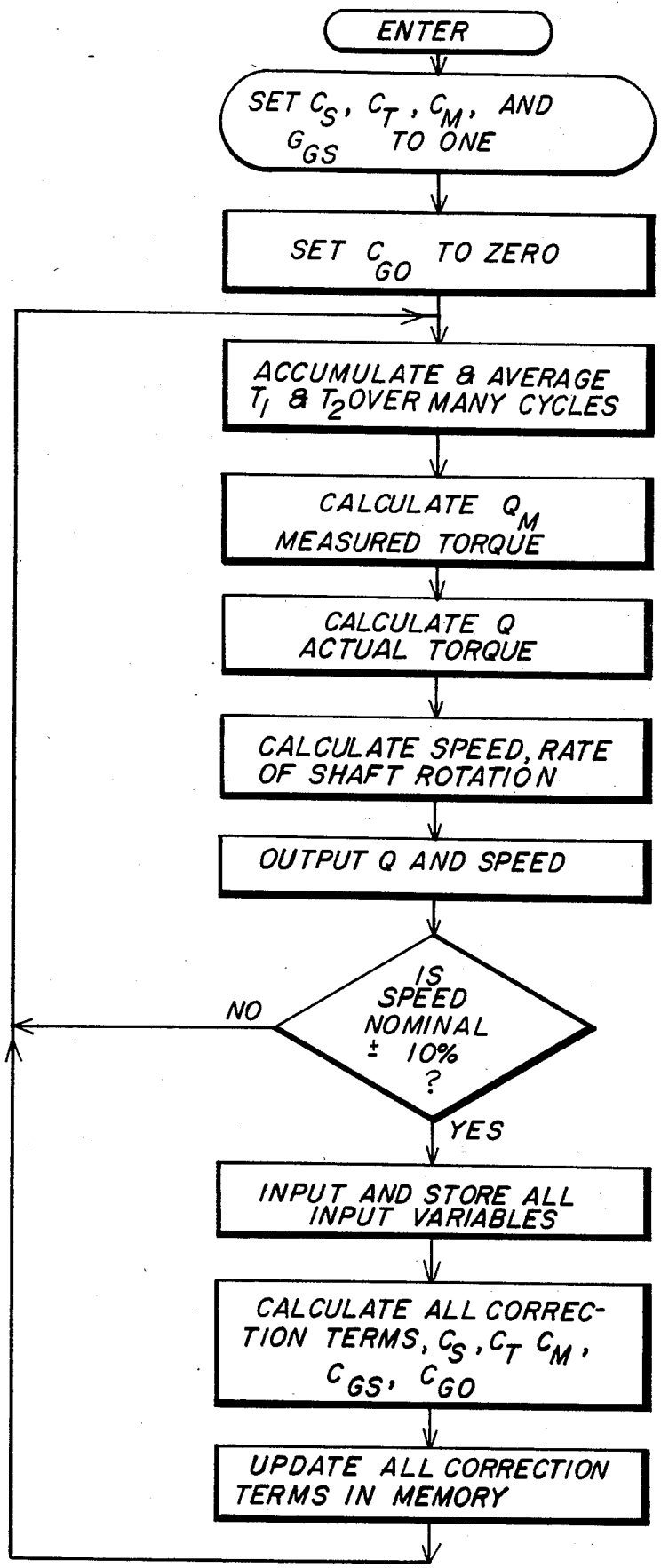

FIG. 6 is a more detailed schematic depiction of a possible arrangement of toothed torque/reference wheels in the embodiment of FIG. 4 so as to store five binary-valued bits of data; and FIG. 7 is a flow chart of a suitable computer program structure that may be embedded in the memory of the microprocessor in FIG. 4 so as to achieve a desired automatic self-compensation of the output torque signal for variations in gap size, shaft speed and shaft modulus.

Figure 1:
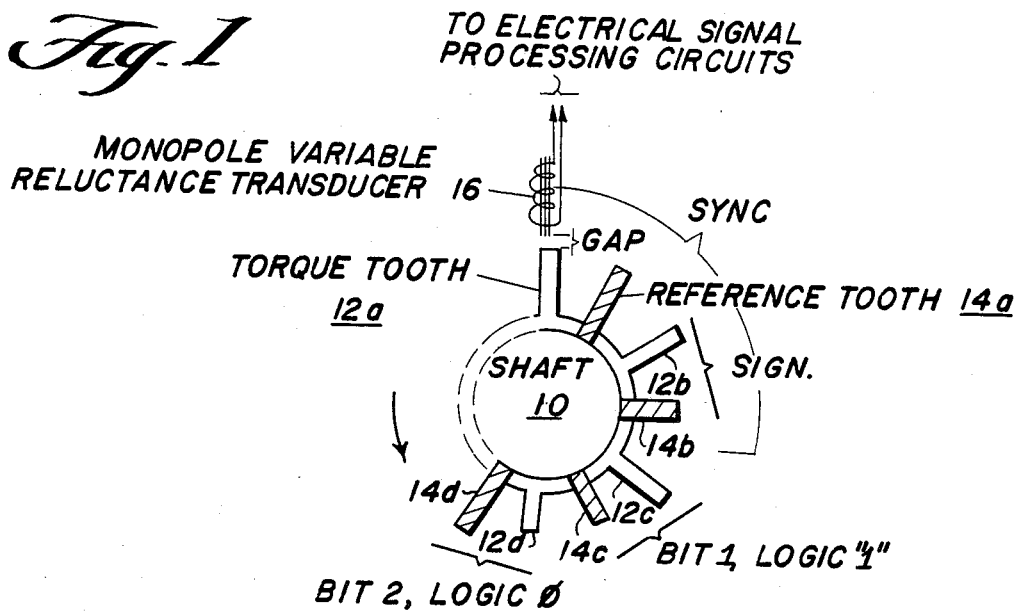
FIG. 1 is a schematic depiction of enmeshed toothed torque and reference torque meter wheels containing embedded data structures in accordance with an exemplary embodiment of this invention.

FIG. 1 depicts a schematic end view of an exemplary torque meter apparatus for measuring the torque transmitted along a rotatable shaft 10. A toothed torque wheel having individual torque teeth 12 is rigidly affixed with respect to one point on the shaft 10 while a similar toothed reference wheel having teeth 14 is also affixed to the shaft 10 at a second spaced-apart location (e.g., via a tubular coupling sleeve). As shown in FIG. 1, the reference teeth 14 are typically interleaved between the torque teeth 12. In fact, in many commercial embodiments, the teeth 12, 14 have portions which extend axially (i.e., parallel to the axis of shaft 10) into an overlapped area about the circumference of the toothed wheel structures. These overlapped axially extending and interleaved portions of the teeth 12, 14 then pass by a monopole variable reluctance transducer 16 as the shaft 10 is rotated in the direction of the indicated arrow. There is, of course, a gap between the radially outward edges of the teeth 12, 14 and the monopole transducer 16 so as to permit such relative rotational movement. This general arrangement is depicted in somewhat more detail at U.S. Pat. No. 3,548,649.

As will be understood, as the shaft 10 is rotated, the monopole transducer 16 will output a train of electrical pulses respectively associated with the succession of passing teeth 12, 14. As the rotating shaft 10 is torsionally loaded (i.e., meaning that it is transmitting torque), then the section of shaft between the shaft attachment points for the toothed torque and reference wheels will be caused to "twist" in accordance with that shaft's modulus of torsional elasticity. In so twisting, alternate spacings between the torque teeth 12 and reference teeth 14 will be shortened or lengthened depending upon the direction of torque transmission. The occurrence of respectively corresponding electrical pulses at the output of the monopole transducer 16 will thus be similarly shifted in the time domain. Transmitted shaft torque may then be derived by analyzing corresponding timing intervals T1 and T2 as will be appreciated. The magnitude of the electrical pulses output from the monopole transducer 16 will be related to the gap between a passing tooth and the pole face of the transducer 16. In conventional monopole torque meters, this gap is nominally a constant value although, as previously explained, unintended variations in the gap may be a source of error in the resulting torque measurement.

Figure 2:
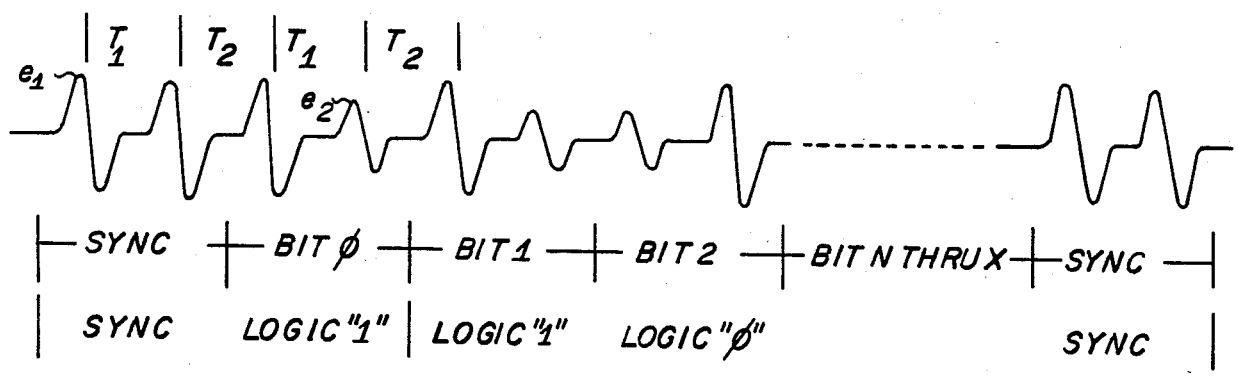
FIG. 2 is a waveform diagram schematically depicting a train of electrical signal pulses such as might be output from a monopole variable reluctance sensor used in association with the toothed torque/reference wheels of FIG. 1.

However, in the exemplary embodiment of FIG. 1, the radial dimensions of selected ones of the teeth 12, 14 are shortened (e.g., teeth 14b, 14c, and 12d) so as to purposely vary the gap and thus produce a component of differential amplitude modulation into the resulting pulse train as graphically depicted in FIG. 2. In this manner, the toothed torque and reference wheels also include embedded data structures (i.e., a predetermined spatial pattern of differing radial tooth dimensions) which may be utilized to permanently encode desired data such as variations of the modulus of torsional elasticity for a particular shaft with respect to an expected nominal value.

In the embodiment depicted at FIGS. 1 and 2, a Manchester-type digital code has been employed where a pair of adjacent teeth (e.g., 12c, 14c) are utilized to encode a single binary-valued bit of data. As depicted, a logic "1" is encoded by a high, low pulse amplitude pattern while a logic "0" bit value is represented by a low, high pulse amplitude sequence. This permits the use of one or more of the remaining possible pulse pair sequences (e.g., high, high or low, low) to be utilized, at least in part, as a unique once-per-revolution synchronization pattern. Such synchronization signals may be useful, for example, in the expanded range monopole torque measuring system of U.S. Pat. No. 4,488,443—Parkinson (1984) and/or even in the process of decoding the pulse stream of FIG. 2 so as to determine where the bit "frame" boundaries occur. In FIG. 2, such frame boundaries are indicated as defining bits 0, 1, 2 . . . N through X. As will be understood, it may be necessary to devote two such bit frames to the synchronization function so as to surely define a totally unique pattern of pulse amplitudes that cannot be found within any valid pattern of data (e.g., a high, high, high, low sequence or a high, high, low, high sequence). As depicted in FIG. 2, the unique synchronization sequence may also include a sign bit.

The time intervals T1 and T2 represent the relative dimensions of alternate intervals between torque and reference teeth and which thus correspond to the torque being transmitted by shaft 10. As will be appreciated by those in the art, the transmitted shaft torque is proportional to T1/(T1+T2). As will also be appreciated, the shaft speed is proportional to 1/(T1+T2); however, this parameter has typically not been used in compensating for errors induced in the torque measurement signal due to speed variations.

Because a purposeful differential amplitude modulation has now been introduced into the pulse train of FIG. 2 (e.g., a "high" amplitude pulse level $e_1$ and a "low" amplitude pulse level $e_2$), the output from transducer 16 now also includes information concerning the size of the gap between transducer 16 and the rotating torque/reference teeth. In particular, this gap is proportional to the ratio $e_1/e_2$ thus providing sufficient information to permit torque measurement error to be compensated for variations in the gap dimension.

Variations from a nominal modulus of torsional elasticity for a given shaft 10 (and/or any other desired data unique to a particular shaft) may be permanently embedded in the data structure of the toothed torque/reference wheels as depicted in FIGS. 1 and 2. In this manner, the embedded digital data may be automatically decoded and used by the signal processing circuitry so as to automatically compensate for the particular shaft modulus or other unique characteristics of a particular shaft 10.

Figure 3:
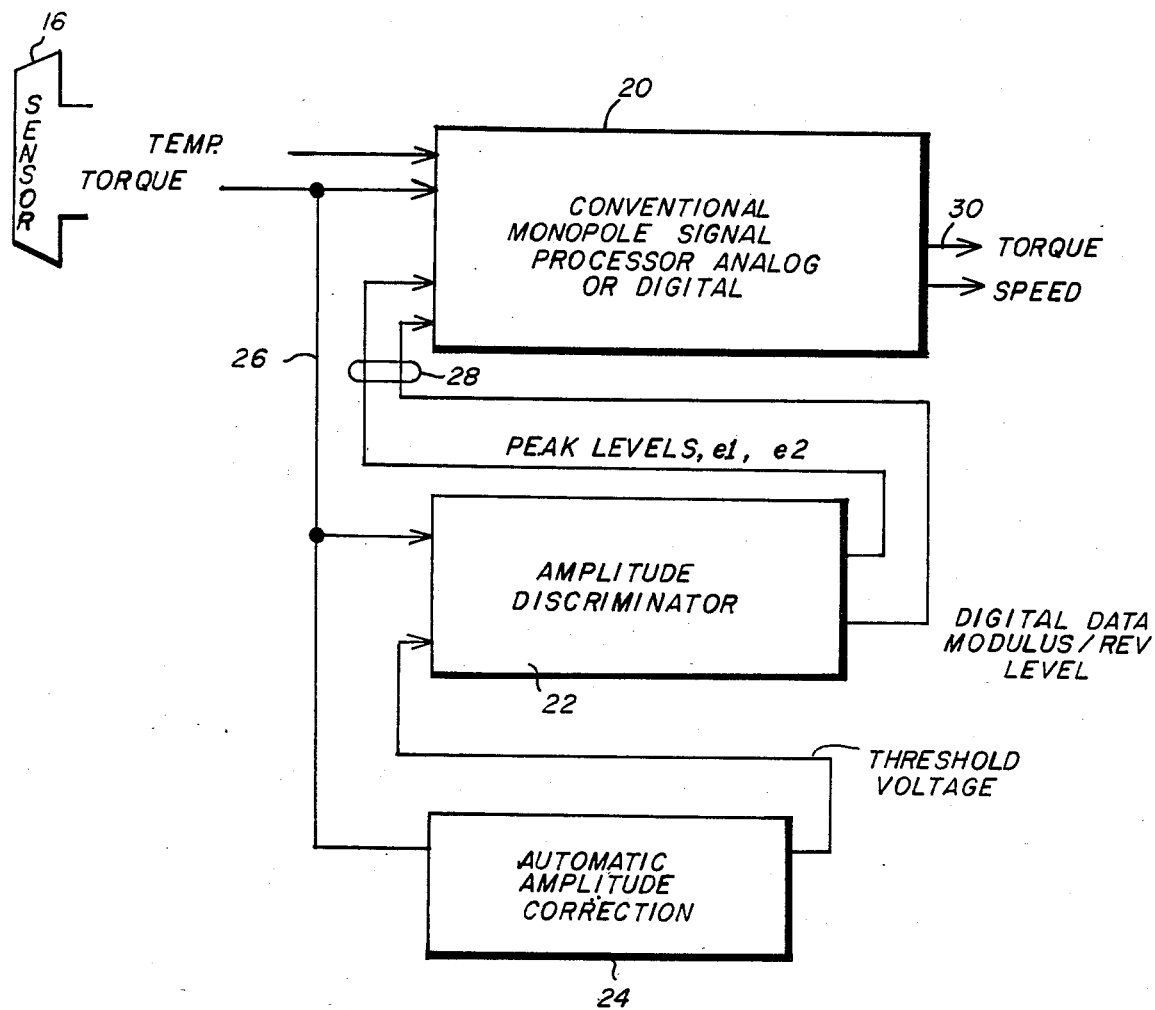
FIG. 3 is a block diagram of a suitable electrical signal processing circuit for use with the toothed torque/reference wheels of FIG. 1.

As depicted in the block diagram of FIG. 3, a conventional sensor 16 may include the variable reluctance monopole transducer depicted in FIG. 1 as well as a temperature sensing component to provide conventional inputs to the monopole signal processor (either analog or digital) 20 which outputs electrical signals representing measured shaft torque and speed.

The FIG. 3 embodiment of this invention additionally includes a pulse amplitude discriminator 22 and an automatic amplitude correction circuit 24 tapped onto the torque output pulse train from sensor 16. The purpose of the automatic amplitude correction circuit 24 is to provide an appropriate threshold voltage to the amplitude discriminator 22 so that it may properly discriminate between the high and low pulse amplitudes $e_1$ and $e_2$. For example, the automatic amplitude correction circuit 24 may take the form of a simple short-term signal averaging circuit. In this manner, even though the absolute pulse amplitudes will vary as a function of shaft speed and gap size, a short-term average of the positive-going portions of several pulses should inherently produce a threshold voltage located somewhere between the high and low positive-going pulse amplitude levels. Accordingly, an appropriate threshold voltage may thus be generated for discriminating between the high and low positive-going pulse amplitudes (e.g., with a simple signal comparison circuit) so as to derive a corresponding chain of analog or digital signals on output lines 28 from the amplitude discriminator 22. When this additional information is made available to the signal processing circuit 20, it may be suitably modified so as to compensate the torque measurement output at 30 for detected variations in speed and gap size. Since conventional monopole signal processors typically already include circuitry for effecting a shaft modulus compensation, if this data is automatically detected and input via lines 28, then the monopole signal processor may be caused to automatically effect the desired compensation for variations therein for a particular shaft 10.

A more detailed block diagram of an exemplary digital signal processing system is depicted at FIG. 4. As shown, the conventional monopole variable reluctance sensor 16 also includes a temperature sensitive resistance element which provides a temperature-related input signal. A suitable bias for the temperature sensor component is provided via resistor 40, as will be explained in more detail below.

The twist/speed/gap-related pulse train output from the variable reluctance portion of sensor 16 is processed by low-pass filter 42 so as provide the pulse train waveform $W_A$ as depicted in FIG. 5 (analogous to that also depicted in FIG. 2). Such a low-pass filter is desired, for example, to reduce the noise content of this signal pulse train. For purposes of providing a particular example useful in explaining underlying general principles, a particular spatial pattern of torque/reference teeth representing five bit intervals is assumed as depicted in FIG. 6. As earlier noted, if a fully balanced wheel structure is desired, then twice as many bit intervals must be accommodated so that a balancing tooth of similar size can be located opposite each tooth. As should be appreciated, this implies the inclusion of redundant information structures.

The remaining uppermost input signal processing channel (comprising zero-crossing detector 44, flip-flop 46 and timer circuits 48) corresponds to a conventional monopole signal processing channel. In effect, the timing data T1 and T2 are detected, digitized and presented to the microprocessor system 50 for deriving appropriate twist and speed information therefrom.

In relatively simple conventional monopole torque meters, the output of flip-flop 46 (waveform $W_B$ in FIG. 5) may simply be short-term averaged to provide an analog output torque signal. Alternatively, the time periods T1 and T2 may be digitally measured by timer 48 and provided as successive digital words on data bus 52 to a conventional microprocessor CPU/memory 54 for further digital signal processing. For example, a bit-parallel digital signal corresponding to measured torque may be periodically derived and output on the control/data bus 52 at output 56 or at some other output port of the microprocessor system 50. Alternatively, a bit-serial digital output signal corresponding to the torque or speed may be output at 58. Still further, if desired, a digital torque output signal may be converted to an analog torque output signal at 60 by a conventional digital-to-analog converter 62 as will be appreciated by those in the art.

The microprocessor CPU 54 may also be conventionally programmed so as to provide an appropriate analog temperature reference bias through resistor 40 and conventional digital-to-analog converter 64. The temperature input data is provided to CPU 54 via conventional multiplexer 66 and conventional analog-to-digital converter 68 as should be apparent from FIG. 4. The multiplexer 66 is provided and may be controlled by a suitable control line 70 so as to permit the same analog-to-digital converter 68 to also be used to provide input data from the middle input signal processing channel shown in FIG. 4 (comprising a conventional sample-and-hold amplifier 72 controlled by the output of time delay 74 and conventional one-shot multivibrator circuit 76).

As depicted in the waveforms of FIG. 5, the $W_B$ waveform is time delayed at 74 so as to cause its transitions to approximately coincide with the positive-going peaks of the pulse train waveform $W_A$. These transitions then trigger one-shot 76 to produce a sequence of properly timed short duration control pulses $W_C$ to control the sample-and-hold amplifier 72 such that it provides a train of sampled positive peak amplitude values at its output to multiplexer 66. Accordingly, when the multiplexer is controlled by line 70 to select its upper input, this is connected to analog-to-digital converter 68 and an appropriate digital word representing the sampled peak amplitude of the input pulse train is thus provided to CPU 54. In this manner, the relative amplitudes of successive positive peaks in the incoming pulse train are captured and stored for further signal processing by the CPU/memory 54.

The timer 48 may be any desired conventional device for measuring the time intervals T1 and T2 from a square waveform $W_B$ as depicted in FIG. 5. For example, the contents of a clock driven counter could simply be successively read into an appropriate digital latch and reset to restart counting at each detected transition of the waveform $W_B$. The same circuit could also provide an interrupt signal to CPU 54 each time such a transfer occurs so that the CPU might then soon thereafter fetch and store the contents of the latch for subsequent digital signal processing. Alternatively, the CPU 54 may be programmed so as to periodically review and store the contents of such a latch (and possibly reset it). One conventional integrated circuit now available for performing such timing functions may be purchased from the Harris Corporation and is identified by integrated circuit number 82C54.

The CPU/memory 54, the digital-to-analog converters and analog-to-digital converters, multiplexer, delay circuits, flip-flops, sample-and-hold amplifiers, one-shot multivibrators and the like otherwise depicted in FIG. 4 may be realized by conventional and well-known commercially available circuits as will be appreciated by those in the art.

One exemplary embodiment of a suitable computer program which may be stored in the memory of CPU/memory 54 and utilized for controlling its operation is depicted schematically in the flow chart of FIG. 7. In that chart, various alpha-numeric symbols have the following means:

$$Q = Q_M C_S C_T C_M C_{GS} + C_{GO} \quad \text{(Equation 1)}$$

$$Q_M = K(T_1 - T_2)/(T_1 + T_2) \quad \text{(Equation 2)}$$

$$C_S = 1 + F_S - (F_S \times S/S_N) \quad \text{(Equation 3)}$$

$$C_T = 1 - F_T(T - T_N) \quad \text{(Equation 4)}$$

$$C_M = 1 - F_M \quad \text{(Equation 5)}$$

$$C_{GS} = 1 - F_{GS}(G - G_N) \quad \text{(Equation 6)}$$

$$C_{GO} = F_{GO}(G_N - G)Q_N \quad \text{(Equation 7)}$$

where:

K is a system scale factor. This is the ratio between twist in degrees and torque in foot pounds.

Q is the final output torque measurement.

$Q_M$ is the measured torque, that is shaft twist as transmitted by the monopole sensor phase signal.

$C_S$ is a correction term for the shaft speed of rotation error.

$C_T$ is a correction term for the change in shaft modulus of elasticity with temperature.

$C_M$ is a correction term for unit-to-unit variations in the twist vs. torque characteristic of the shaft.

$C_{GS}$ is a correction term for the slope portion of the gap related error.

$C_{GO}$ is a correction term for the offset portion of the gap related error.

$F_S$ is a factor which quantifies the speed error for a particular design. It is expressed in units of % error over a specified speed range of zero to nominal speed.

S is the actual speed of shaft rotation as transmitted by the frequency of the monopole sensor signal.

$S_N$ is the nominal shaft speed for a particular engine design.

$F_T$ is a factor which quantifies the temperature error for a particular shaft design. It is a result of the material used in the shaft. It is expressed as % per degree centigrade.

T is the actual shaft temperature as transmitted by the monopole sensor temperature sensing element.

$T_N$ is the nominal shaft temperature for a particular engine design.

$F_M$ is a factor which quantifies the deviation of a particular shaft's twist vs. torque characteristic relative to the average of many shafts of the same design. It is expressed as a plus or minus percent. The plus sign signifies that the twist per given torque exceeds the nominal value.

$F_{GS}$ is a factor which quantifies the slope or scale error resulting from a change in the distance between the monopole sensor tip and the high point of the highest shaft teeth. It is expressed as % per thousandths of an inch.

$F_{GO}$ is a factor which quantifies the constant portion of the gap error. It is expressed as percent per thousandths of an inch.

G is the actual gap as transmitted by the differential amplitude of the monopole sensor signal.

$G_N$ is the nominal gap for a particular engine design.

$Q_N$ is the nominal engine torque for a particular design expressed in ft. lbs.

$T_1$ and $T_2$ are the "on" and "off" times of the median values processed sensor signal as shown in $W_B$.

Examples of possible median values and/or ranges for the above terms and factors based in some typical applications are:

$F_S$: 1.25%
S: 5 to 20 thousand RPM
$S_N$: 18 thousand RPM
$C_S$: @ 5 thousand RPM, 1.009
$F_T$: 0.02% per °C.
T: 180° to 360° C.
$T_N$: 240° C.
$C_T$: @ 180° C., 1.012
$F_M$: −3% to +3%
$C_M$: @ $F_M$=−2%, 1.02
$F_{GS}$: 0.05% per thousandths inch
G: 20 to a thousandths inch
$G_N$: 40 thousandths inch
$G_{GS}$: @ G=20, 1.01
$F_{GO}$: 0.025% per thousandths inch
$C_{GO}$: @ G=20, $Q_N$=500, 25 ft. lbs.
$Q_M$: 200 to 2000 ft. lbs.
Q: @ $Q_M$=500 at above conditions, 551 ft. lbs., that is, 10.2% greater than $Q_M$.

As presently contemplated, it is believed that approximately five frame bits may be needed to provide a sufficient range of encoded shaft modulus data in a practical environment. For example, a range of ±3.5% in 0.5% increments might thus be encoded in accordance with the following table:

TABLE A

Modulus Code Scheme

| Signal Pattern | Binary Code | Decimal Value | Modulus Correction Factor |
|---|---|---|---|
| HH HL HL HL HL | 1111 | +7 | +3.5% |
| HH HL HL HL LH | 1110 | +6 | +3.0% |
| . | 1101 | +5 | +2.5% |
| . | 1100 | +4 | +2.0% |
| . | 1011 | +3 | +1.5% |
| . | 1010 | +2 | +1.0% |
| . | 1001 | +1 | +0.5% |
| . | 1000 | 0 | +0.0% |
| . | 0000 | 0 | −0.0% |
| HH LH LH LH HL | 0001 | −1 | −0.5% |
| . | 0010 | −2 | −1.0% |
| . | 0011 | −3 | −1.5% |
| . | 0100 | −4 | −2.0% |
| . | 0101 | −5 | −2.5% |
| . | 0110 | −6 | −3.0% |
| . | 0111 | −7 | −3.5% |
| $b^4$  $b^3$  $b^2$  $b^1$  $b^0$ | | | Bit Designation |
| Sync  Sign   magnitude | | | Bit Function |
| +/0    $2^2$  $2^1$  $2^0$ | | | Bit value; Binary |
| +/−    2.0  1.0  0.5 | | | Bit value; Decimal % |

Shaft modulus errors include errors induced by changes in the shaft modulus with respect to temperature and/or from unit-to-unit due to material and geometry variations from shaft-to-shaft. Such scale errors typically involve +2% of full scale for a temperature of 100° C. and ±3% of full scale for unit-to-unit material and geometry variations. However, as previously indicated, when temperature and modulus variations are properly compensated, the net error in measured torque due to the modulus/temperature factors may be maintained to within approximately ±0.25%. However, with this invention, such shaft modulus variations may be accomplished automatically based upon the permanently embedded data structures within the torque/reference toothed wheels of the torque meter itself.

Gap related errors in torque measurements result from variations in the distance between the outermost tooth surface and the pole tip of the monopole transducer. Typical measurement errors due to gap variations may range from approximately 0.2% to 1.7% of full scale offset error and from approximately 0.4% (of full scale) to approximately 2% (of full scale) linear scale error. As earlier mentioned, if an error of approximately ±0.5% is assumed without compensation, then using compensation in accordance with this invention may provide as little as approximately ±0.1% error.

Speed errors represent the change in measured apparent shaft twist caused merely as a result of a phase change occurring because of an increased rate of shaft rotation even though the actual shaft twist remains constant. The expected speed related error in torque measurements has been observed to range, for example, from approximately +0.2% to approximately +2.1% when the speed is changed from approximately 5,000 RPM to approximately 20,000 RPM. As previously explained, if a speed error of approximately ±0.3% full scale is assumed, then compensation in accordance with this invention may produce a resulting compensated speed error of only ±0.1%. (However, over a lower speed range of 0 to approximately 2,000 RPM, speed error contribution of approximately +1.25% might also be expected.)

Although only a few exemplary embodiments have been described in detail, those skilled in the art will recognize that many possible variations and modifications may be made in these exemplary embodiments while yet retaining many of the novel features and advantages of this invention. Accordingly, all such modifications and variations are intended to be includes within the scope of the appended claims.

What is claimed is:

1. In a monopole shaft torquemeter having at least a pair of toothed wheels attached to a rotatable shaft, the improvement comprising:

a plurality of differently dimensioned teeth disposed about at least one of said wheels in a predetermined spatial pattern representing predetermined modulus data corresponding, at least in part, to the modulus of torsional elasticity of said shaft.

2. An improved monopole shaft torquemeter as in claim 1 further comprising:

signal processing means for detecting said modulus data and for automatically deriving a transmitted torque measurement signal compensated by said modulus data.

3. An improved monopole shaft torquemeter as in claim 2 wherein said teeth have different radial dimensions thereby producing a sensed signal having a differential amplitude component related to a gap between said teeth and a monopole tooth sensor, said signal processing means also automatically compensating said transmitted torque measurement signal for variations in said gap dimension.

4. An improved monopole shaft torquemeter as in claim 3 wherein said signal processing means also automatically compensates said transmitted torque measurement signal for variations in shaft speed.

5. An improved monopole shaft torquemeter as in claim 2 wherein said signal processing means also automatically compensates said transmitted torque measurement signal for variations in shaft speed.

6. An improved monopole shaft torquemeter as in claim 2 wherein said signal processing means comprises a programmed digital computer circuit.

7. An improved monopole shaft torquemeter as in claim 1 wherein said teeth have different radial dimensions thereby producing a sensed signal having a differential amplitude component related to a gap between said teeth and a monopole tooth sensor, and further comprising a signal processing means that automatically provides a transmitted torque measurement signal compensated for variations in said gap dimension.

8. An improved monopole shaft torquemeter as in claim 7 wherein said signal processing means also automatically compensates said transmitted torque measurement signal for variations in shaft speed.

9. An improved monopole shaft torquemeter as in claim 7 wherein said signal processing means comprises a programmed digital computer circuit.

10. An improved monopole shaft torquemeter as in claim 1 wherein said predetermined spatial pattern includes a unique reference or synchronization pattern at at least one rotational position thereby providing an at least once-per-revolution reference or synchronizing sensed signal component.

11. A torque measurement apparatus for use in measuring the torque transmitted by a rotatable shaft, said apparatus comprising:
a pair of toothed wheels attached to said shaft at respective spaced-apart locations therealong and having respective teeth which individually project, at least in part, radially outwardly away from said shaft;
at least one tooth-detector means disposed radially outwardly from said teeth for sensing the passage of teeth thereby and for producing an electrical sensor output signal corresponding thereto;
some of said teeth having different radial dimensions than others so as to produce corresponding differences in said electrical signal whereby predetermined information is encoded within said apparatus by providing a predetermined spatial pattern of said different radial teeth dimensions.

12. A torque measurement apparatus as in claim 11 wherein said predetermined information corresponds to the modulus of torsional elasticity associated with said rotatable shaft and further comprising signal processing means for detecting said modulus information and for automatically deriving a transmitted torque measurement signal compensated by said modulus.

13. A torque measurement apparatus as in claim 12 wherein said signal processing means also derives a shaft speed measurement signal from said electrical sensor output signal and also automatically derives a transmitted torque measurement signal compensated by said speed measurement signal.

14. A torque measurement apparatus as in claim 13 wherein said signal processing means also derives a tooth-detector gap measurement signal from said electrical sensor output signal and also automatically derives a transmitted torque measurement signal compensated by said gap measurement signal.

15. A torque measurement apparatus as in claim 11 wherein said predetermined spatial pattern includes a unique reference or synchronization pattern at at least one rotational location thereby providing an at least once-per-revolution reference or synchronization signal component as part of said electrical sensor output signal.

16. In a monopole transducer shaft torquemeter having a monopole transducer and toothed wheels, an improved signal processing means comprising:
pulse amplitude detecting means for processing a sequence of electrical pulse signals from said monopole transducer and for generating a corresponding sequence of different amplitude-detector signals related to the detected different respective amplitudes of said pulse signals; and
compensation means adapted to accept as control inputs said different amplitude-detector signals and to responsively derive from said pulse signals a transmitted shaft torque measurement output signal that is compensated for the modulus of torsional elasticity of said shaft.

17. An improved monopole transducer shaft torquemeter as in claim 16 wherein said signal compensation means also automatically compensates for a gap between a toothed wheel and the monopole transducer.

18. An improved monopole transducer shaft torquemeter as in claim 17 wherein said signal compensation means also automatically compensates for the speed of the shaft.

19. A monopole shaft torquemeter comprising:
a rotatable shaft;
a toothed torque wheel attached to said shaft at a first location and having teeth which extend axially and radially with respect to said shaft;
a toothed reference wheel attached to said shaft at a second location and having teeth which also extend axially and radially with respect to said shaft;
said torque wheel and reference wheel teeth being interleaved at a predetermined circumferential location and having different radial dimensions thereat in a predetermined spatial pattern;
a monopole variable reluctance tooth detector having a pole face disposed at a predetermined nominal gap dimension radially outwardly of said predetermined circumferential location of interleaved teeth and producing a train of electricl sensor pulse signals in response to the passage of teeth thereby as said shaft is rotated and having a differential pulse amplitude component due to said different radial dimensions; and
self-compensating signal processing means connected to receive said sensor pulse signals and to produce a related torque output signal representing the torque being transmitted by said shaft as compensated by detecting and using said differential pulse amplitude component.

20. A monopole shaft torquemeter as in claim 19 wherein said predetermined spatial pattern corresponds to the modulus of torsional elasticity of said shaft and wherein said self-compensating electrical signal processing means comprises a digital signal processor programmed to compensate said torque output signal for said modulus and for said gap.

21. A monopole shaft torquemeter as in claim 20 wherein said digital signal processor is also programmed to compensate said torque output signal for shaft speed as represented by the frequency of said sensor pulse signals.

22. A monopole shaft torquemeter as in claim 21 wherein said monopole detector includes a temperature sensor having an electrical output also connected to said self-compensating electrical signal processing means and wherein said digital signal processor is also programmed to compensate said torque output signal for temperature.

23. A monopole shaft torquemeter as in claim 19 wherein said self-compensating electrical signal processing means comprises:
  a timing input channel for detecting relative times T1, T2 between consecutive sensor pulse signals corresponding to the relative rotational positions of said torque and reference wheels and for providing corresponding digital T1, T2 signals;
  a pulse amplitude input channel for detecting the relative amplitudes $e_1$, $e_2$ of consecutive sensor pulse signals corresponding to said predetermined spatial pattern and to said gap dimension and for providing corresponding digital $e_1$, $e_2$ signals; and
  digital signal processing means connected to receive said digital T1, T2, $e_1$, $e_2$ signals and to produce said torque output signal as a function thereof.

24. A method of self-compensating a monopole shaft torque meter for the modulus of torsional elasticity of a given rotatable shaft, said method comprising the steps of:
  encoding predetermined data representing the modulus of torsional elasticity of a torque meter shaft directly into the physical structure of associated torque meter components which are affixed to the rotatable shaft for rotation therewith so as to correspondingly modulate a transduced electrical output signal when in use;
  detecting said predetermined data from said modulated output signal; and
  deriving a measured output torque signal which is compensated in accordance with said predetermined data.

25. A method of self-compensating a monopole shaft torque meter for the modulus of torsional elasticity of a given shaft, said method comprising the steps of:
  encoding predetermined data representing the modulus of torsional elasticity of a torque meter shaft directly into the physical structure of associated torque meter components so as to correspondingly modulate a transduced electrical output signal from a monopole transducer when in use;
  detecting said predetermined data from said modulated output signal; and
  deriving a measured output torque signal which is compensated in accordance with said predetermined data;
  wherein said deriving step includes compensation for shaft modulus, shaft speed and the gap between said monopole sensor and the torque meter mechanical components rotating with said shaft, all the required data for such compensation being derived from the output of said monopole transducer.

26. A method as in claim 25 wherein said deriving step includes compensation for temperature.

* * * * *

UNITED STATES PATENT AND TRADEMARK OFFICE
CERTIFICATE OF CORRECTION

PATENT NO. : 4,602,515
DATED : July 29, 1986
INVENTOR(S) : Lawrence L. Eichenlaub It is certified that error appears in the above-identified patent and that said Letters Patent are hereby corrected as shown below:

Column 9 Line 30  " G: 20 to athousandths inch "

should read -- G: 20 to 60 thousandths inch --

Signed and Sealed this

Second Day of December, 1986

Attest:

DONALD J. QUIGG

Attesting Officer

Commissioner of Patents and Trademarks